US012210789B2

United States Patent
Kaku

(10) Patent No.: US 12,210,789 B2
(45) Date of Patent: Jan. 28, 2025

(54) TERMINAL APPARATUS, IMAGE DISPLAY METHOD, AND NON-TRANSITORY COMPUTER READABLE MEDIUM

(71) Applicant: TOYOTA JIDOSHA KABUSHIKI KAISHA, Toyota (JP)

(72) Inventor: Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/485,620

(22) Filed: Oct. 12, 2023

(65) Prior Publication Data
US 2024/0126495 A1    Apr. 18, 2024

(30) Foreign Application Priority Data

Oct. 17, 2022   (JP) ................. 2022-166511

(51) Int. Cl.
*G06T 3/14*    (2024.01)
*G06F 3/14*    (2006.01)
*G06T 7/70*    (2017.01)
*G06V 10/141*  (2022.01)

(52) U.S. Cl.
CPC .............. *G06F 3/14* (2013.01); *G06T 7/70* (2017.01); *G06V 10/141* (2022.01); *G06T 2207/10028* (2013.01); *G06T 2207/30196* (2013.01)

(58) Field of Classification Search
None
See application file for complete search history.

(56) References Cited

U.S. PATENT DOCUMENTS

| 2001/0035976 A1* | 11/2001 | Poon ................. H04N 1/00244 358/1.15 |
| 2012/0206577 A1* | 8/2012 | Guckenberger ..... G09B 19/003 348/47 |
| 2018/0040156 A1 | 2/2018 | Kondo et al. |
| 2019/0158802 A1* | 5/2019 | Higuchi .................. G06T 15/20 |
| 2020/0213368 A1* | 7/2020 | Rangel ............... H04L 65/4015 |
| 2020/0413007 A1 | 12/2020 | Horio et al. |
| 2022/0147138 A1* | 5/2022 | Muramoto ......... G02B 27/0179 |

(Continued)

FOREIGN PATENT DOCUMENTS

| JP | 2003-187242 A | 7/2003 |
| JP | 2006154691 A | 6/2006 |

(Continued)

*Primary Examiner* — Parul H Gupta
(74) *Attorney, Agent, or Firm* — Oliff PLC

(57) ABSTRACT

A terminal apparatus includes a controller configured to generate, based on a positional relationship between a virtual light source, a display object corresponding to a first display, and a user object corresponding to a first user who operates a first image displayed on the first display, which are disposed in a virtual three-dimensional space, an image of a shadow of the user object, as a second image, display the first image on a second display toward a second user and superimpose the second image on the first image on the second display, upon detecting a change in a relative position of the first user, adjust a relative position of the user object according to the detected change, update the second image based on a change in the positional relationship resulting from adjustment, and reflect an update of the second image on the second display.

19 Claims, 7 Drawing Sheets

(56) References Cited

U.S. PATENT DOCUMENTS

2023/0377252 A1* 11/2023 Kaku .................... G06F 3/1423
2024/0220000 A1* 7/2024 Hori ........................ G06F 3/011

FOREIGN PATENT DOCUMENTS

| JP | 2008-027050 A | 2/2008 |
| JP | 2008-310393 A | 12/2008 |
| JP | 2013-130678 A | 7/2013 |
| JP | 2016-162142 A | 9/2016 |
| JP | 2019-149626 A | 9/2019 |
| JP | 2019-192177 A | 10/2019 |
| JP | 2020-181263 A | 11/2020 |

* cited by examiner

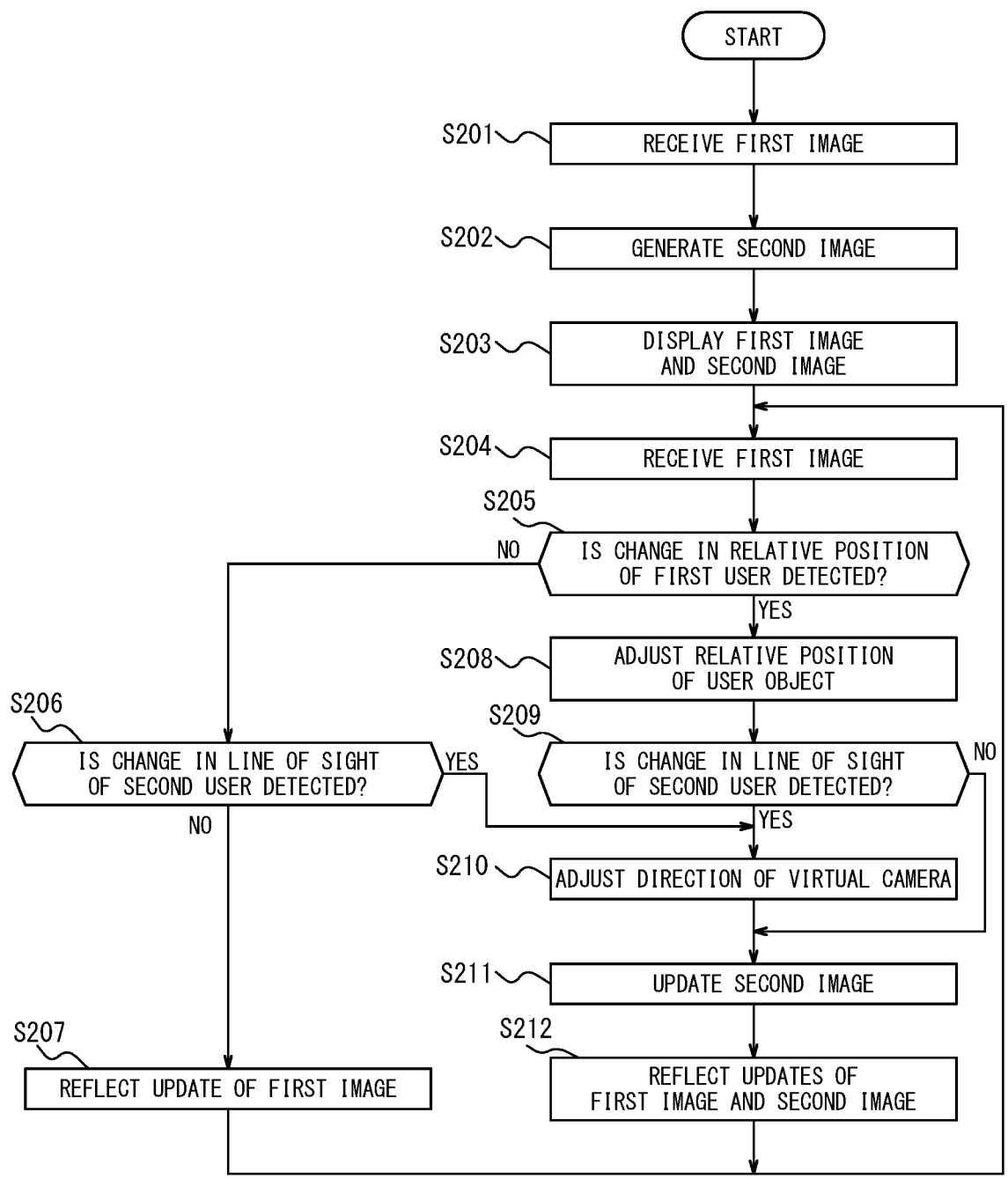

TERMINAL APPARATUS, IMAGE DISPLAY METHOD, AND NON-TRANSITORY COMPUTER READABLE MEDIUM

CROSS-REFERENCE TO RELATED APPLICATION

This application claims priority to Japanese Patent Application No. 2022-166511 filed on Oct. 17, 2022, the entire contents of which are incorporated herein by reference.

TECHNICAL FIELD

The present disclosure relates to a terminal apparatus, an image display method, and a program.

BACKGROUND

Patent Literature (PTL) 1 discloses a program to share the viewpoint of an avatar object disposed in a virtual space among other avatar objects.

CITATION LIST

Patent Literature

PTL 1: JP 2019-192177 A

SUMMARY

A remote dialogue system may be used to realize a service in which students receive, from a remote teacher, a lesson that involves physical movements, such as a calligraphy lesson. However, it is difficult for the students to recognize the teacher's physical movements via conventional systems.

It would be helpful to make it easier for a user to recognize physical movements of another user who is present in a separate space.

A terminal apparatus according to an aspect of the present disclosure includes a controller configured to:
  generate, based on a positional relationship between a virtual light source, a display object corresponding to a first display, and a user object corresponding to a first user who operates a first image displayed on the first display, an image of a shadow of the user object casted on the display object, as a second image, the virtual light source, the display object, and the user object being disposed in a virtual three-dimensional space;
  display the first image on a second display toward a second user who is present in a second space separate from a first space in which the first user is present, and superimpose the second image on the first image on the second display;
  upon detecting a change in a relative position of the first user with respect to the first display, adjust a relative position of the user object with respect to the display object according to the detected change;
  update the second image based on a change in the positional relationship resulting from adjustment; and
  reflect an update of the second image on the second display.

A terminal apparatus according to another aspect of the present disclosure includes a controller configured to:
  generate, based on a positional relationship between a virtual camera, and a user object corresponding to a first user who operates a first image displayed on a first display, and a direction of the virtual camera, an image of the user object captured by the virtual camera, as a second image, the virtual camera and the user object being disposed in a virtual three-dimensional space;
  display the first image on a second display toward a second user who is present in a second space separate from a first space in which the first user is present, and superimpose the second image on the first image on the second display;
  upon detecting a change in a line of sight of the second user, adjust the direction of the virtual camera according to the detected change;
  update the second image based on a direction of the virtual camera after adjustment; and
  reflect an update of the second image on the second display.

An image display method according to the present disclosure includes:
  generating, based on a positional relationship between a virtual light source, a display object corresponding to a first display, and a user object corresponding to a first user who operates a first image displayed on the first display, or based on a positional relationship between a virtual camera, and the user object, and a direction of the virtual camera, an image of a shadow of the user object casted on the display object or an image of the user object captured by the virtual camera, as a second image, the virtual light source, the display object, and the user object being disposed in a virtual three-dimensional space, or the virtual camera and the user object being disposed in the virtual three-dimensional space;
  displaying the first image on a second display toward a second user who is present in a second space separate from a first space in which the first user is present;
  superimposing the second image on the first image on the second display;
  upon detecting a change in a relative position of the first user with respect to the first display or a change in a line of sight of the second user, adjusting a relative position of the user object with respect to the display object or the direction of the virtual camera according to the detected change;
  updating the second image based on a change in the positional relationship resulting from adjustment or based on a direction of the virtual camera after adjustment; and
  reflecting an update of the second image on the second display.

According to the present disclosure, it becomes easier for a user to recognize physical movements of another user who is present in a separate space.

BRIEF DESCRIPTION OF THE DRAWINGS

In the accompanying drawings:

FIG. 7 is a flowchart illustrating operations of a second terminal apparatus according to the second embodiment of the present disclosure.

DETAILED DESCRIPTION

Figure 1:
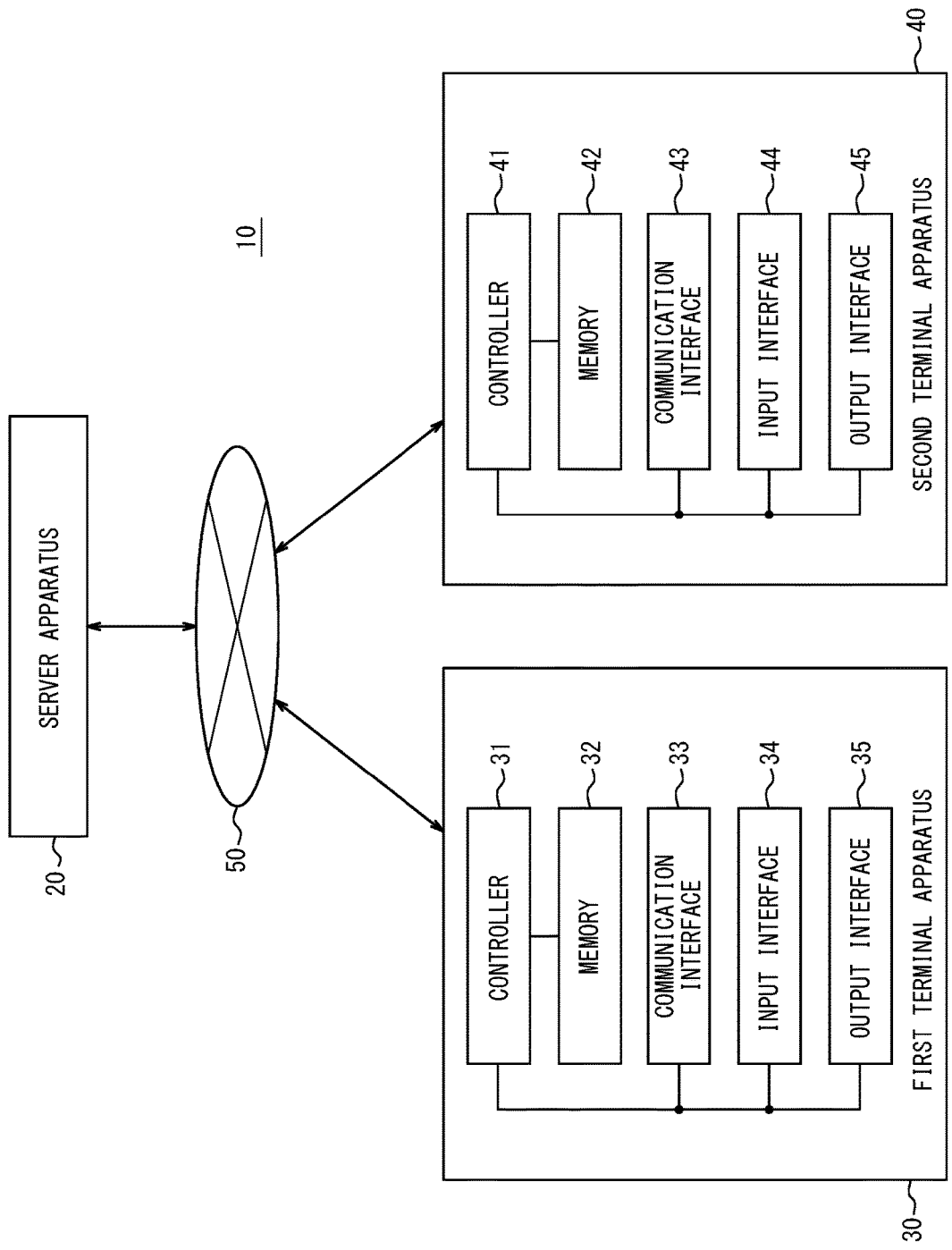
FIG. 1 is a block diagram illustrating a configuration of a communication system according to first and second embodiments of the present disclosure.

Hereinafter, some embodiments of the present disclosure will be described with reference to the drawings.

In the drawings, the same or corresponding portions are denoted by the same reference numerals. In the descriptions of the embodiments, detailed descriptions of the same or corresponding portions are omitted or simplified, as appropriate.

A configuration of a communication system 10 according to first and second embodiments of the present disclosure will be described with reference to FIG. 1.

The communication system 10 includes a server apparatus 20, a first terminal apparatus 30, and a second terminal apparatus 40. The server apparatus 20 can communicate with the first terminal apparatus 30 and the second terminal apparatus 40 via a network 50. The first terminal apparatus 30 may be able to communicate with the second terminal apparatus 40 via the network 50.

The server apparatus 20 is installed in a facility such as a data center and operated by a service provider. The server apparatus 20 is a server computer that belongs to a cloud computing system or other computing system.

Figure 2:
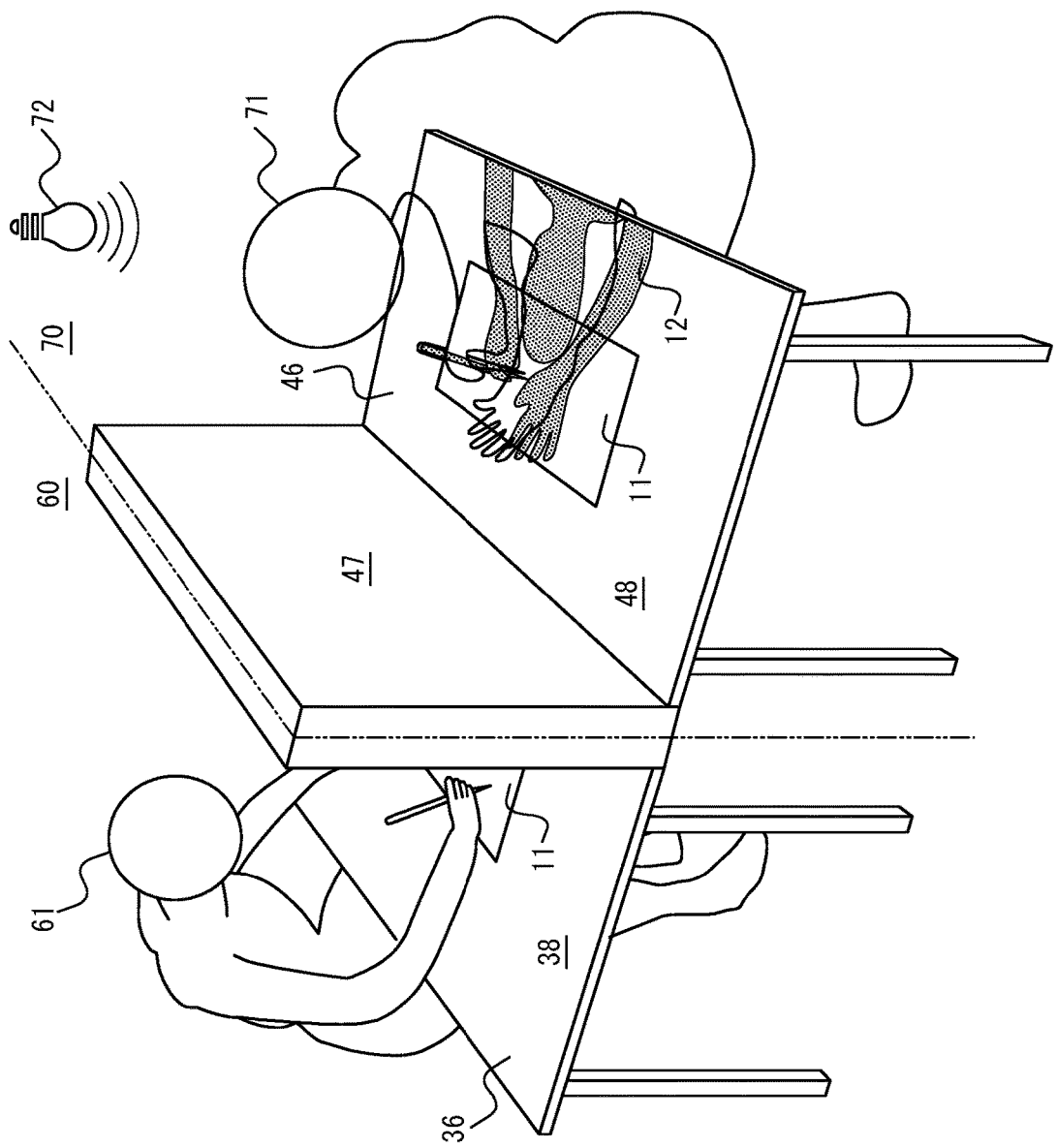
FIG. 2 is a diagram illustrating first and second spaces according to the first embodiment of the present disclosure.
Figure 5:
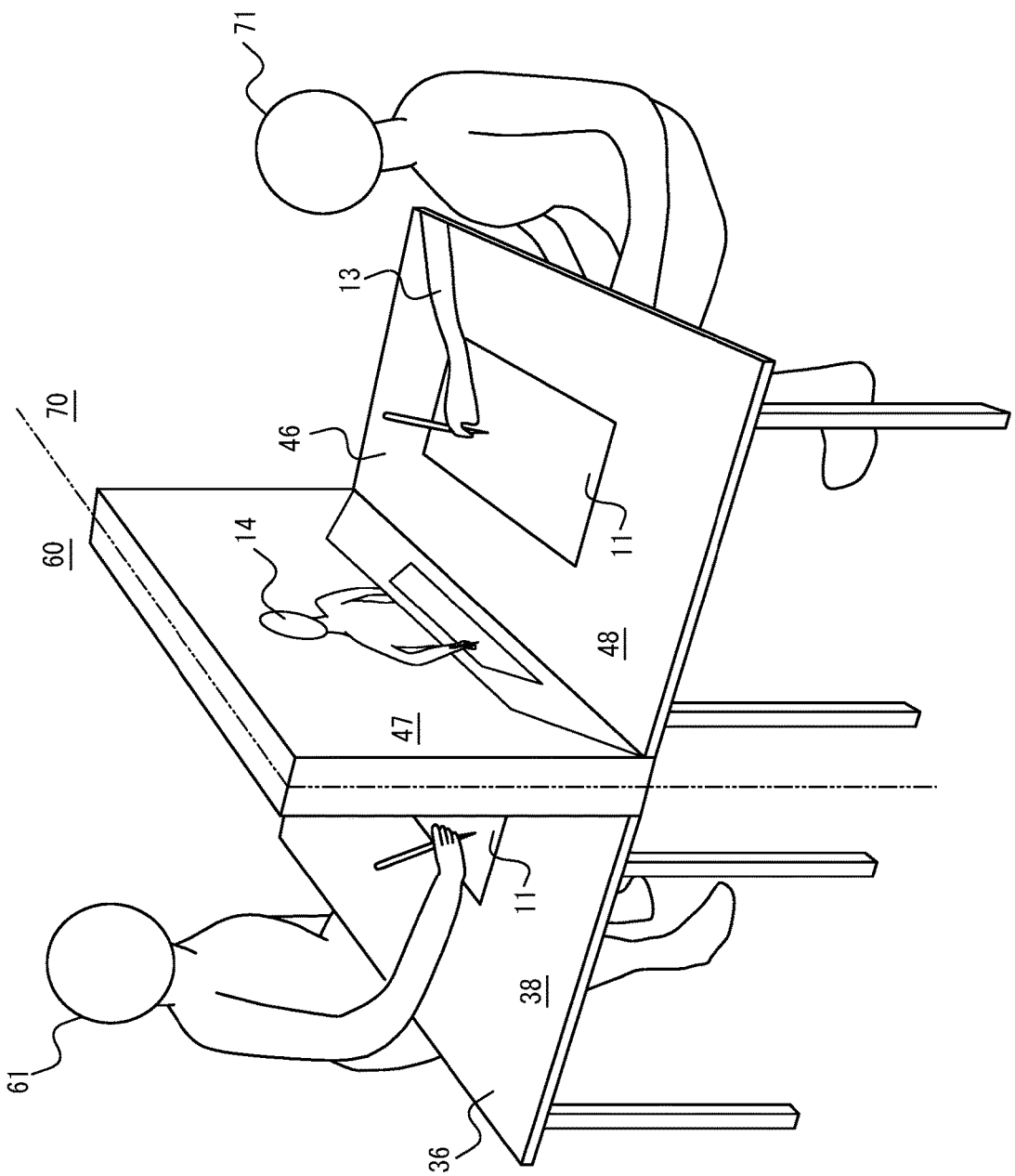
FIG. 5 is a diagram illustrating first and second spaces according to the second embodiment of the present disclosure.

The first terminal apparatus 30 is installed in a first space 60, as illustrated in FIG. 2 or 5, and is used by a first user 61 who is present in the first space 60. The first terminal apparatus 30 is, for example, a general purpose computer, such as a PC, or a dedicated computer specialized for a particular calculation. The term "PC" is an abbreviation of personal computer.

The second terminal apparatus 40 is installed in a second space 70 that is separate from the first space 60, as illustrated in FIG. 2 or 5, and is used by a second user 71 who is present in the second space 70. The second terminal apparatus 40 is, for example, a general purpose computer, such as a PC, or a dedicated computer specialized for a particular calculation.

The network 50 includes the Internet, at least one WAN, at least one MAN, or any combination thereof. The term "WAN" is an abbreviation of wide area network. The term "MAN" is an abbreviation of metropolitan area network. The network 50 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

A configuration of the first terminal apparatus 30 according to the first and second embodiments will be described with reference to FIG. 1.

The first terminal apparatus 30 includes a controller 31, a memory 32, a communication interface 33, an input interface 34, and an output interface 35.

The controller 31 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 31 executes processes related to operations of the first terminal apparatus 30 while controlling the components of the first terminal apparatus 30.

The memory 32 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 32 functions as, for example, a main memory, an auxiliary memory, or a cache memory. The memory 32 stores data to be used for the operations of the first terminal apparatus 30 and data obtained by the operations of the first terminal apparatus 30.

The communication interface 33 includes at least one interface for communication. The interface for communication is, for example, an interface compatible with a wired LAN communication standard such as Ethernet® (Ethernet is a registered trademark in Japan, other countries, or both), a wireless LAN communication standard such as IEEE802.11, or a mobile communication standard such as LTE, the 4G standard, or the 5G standard. The name "IEEE" is an abbreviation of Institute of Electrical and Electronics Engineers. The term "LTE" is an abbreviation of Long Term Evolution. The term "4G" is an abbreviation of 4th generation. The term "5G" is an abbreviation of 5th generation. The communication interface 33 communicates with the server apparatus 20. The communication interface 33 may also communicate with the second terminal apparatus 40. The communication interface 33 receives data to be used for the operations of the first terminal apparatus 30, and transmits data obtained by the operations of the first terminal apparatus 30.

The input interface 34 includes at least one interface for input. The interface for input is, for example, a physical key, a capacitive key, a pointing device, a touch screen integrally provided with a display such as a first display 36 as illustrated in FIG. 2 or 5, a visible light camera, a depth camera, a LiDAR sensor, or a microphone. The term "LiDAR" is an abbreviation of light detection and ranging. The input interface 34 accepts an operation for inputting data to be used for the operations of the first terminal apparatus 30. The input interface 34, instead of being included in the first terminal apparatus 30, may be connected to the first terminal apparatus 30 as an external input device. As an interface for connection, an interface compliant with a standard such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 35 includes at least one interface for output. The interface for output is, for example, a display such as the first display 36, or a speaker. The display is, for example, an LCD or an organic EL display. The term "LCD" is an abbreviation of liquid crystal display. The term "EL" is an abbreviation of electro luminescent. The first display 36 can be a display of any shape. In the first and second embodiments, the first display 36 is an L-shaped display in side view that has a vertical display plane, which extends vertically, and a horizontal display plane 38, which extends horizontally and is adjacent to a lower end of the vertical display plane. The output interface outputs data obtained by the operations of the first terminal apparatus 30. The output interface 35, instead of being included in the first terminal apparatus 30, may be connected to the first terminal apparatus 30 as an external output device. As an interface for connection, an interface compliant with a standard such as USB, HDMI® (HDMI is a registered trademark in Japan, other countries, or both), or Bluetooth® (Bluetooth is a registered trademark in Japan, other countries, or both) can be used.

The functions of the first terminal apparatus 30 are realized by execution of a program according to the first or second embodiment by a processor serving as the controller 31. That is, the functions of the first terminal apparatus 30 are realized by software. The program causes a computer to execute the operations of the first terminal apparatus 30, thereby causing the computer to function as the first terminal apparatus 30. That is, the computer executes the operations of the first terminal apparatus 30 in accordance with the program to thereby function as the first terminal apparatus 30.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, the program stored in the portable medium or the program transferred from the server. Then, the computer reads the program stored in the main memory using a processor, and executes processes in accordance with the read program using the processor. The computer may read the program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. The program encompasses information that is to be used for processing by an electronic computer and is thus equivalent to a program. For example, data that is not a direct command to a computer but has a property that regulates processing of the computer is "equivalent to a program" in this context.

Some or all of the functions of the first terminal apparatus 30 may be realized by a programmable circuit or a dedicated circuit serving as the controller 31. That is, some or all of the functions of the first terminal apparatus 30 may be realized by hardware.

A configuration of the second terminal apparatus 40 according to the first and second embodiments will be described with reference to FIG. 1.

The second terminal apparatus 40 includes a controller 41, a memory 42, a communication interface 43, an input interface 44, and an output interface 45.

The controller 41 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 41 executes processes related to operations of the second terminal apparatus 40 while controlling the components of the second terminal apparatus 40.

The memory 42 includes at least one semiconductor memory, at least one magnetic memory, at least one optical memory, or any combination thereof. The semiconductor memory is, for example, RAM, ROM, or flash memory. The RAM is, for example, SRAM or DRAM. The ROM is, for example, EEPROM. The flash memory is, for example, SSD. The magnetic memory is, for example, HDD. The memory 42 functions as, for example, a main memory, an auxiliary memory, or a cache memory. The memory 42 stores data to be used for the operations of the second terminal apparatus 40 and data obtained by the operations of the second terminal apparatus 40.

The communication interface 43 includes at least one interface for communication. The interface for communication is, for example, an interface compatible with a wired LAN communication standard such as Ethernet® (Ethernet is a registered trademark in Japan, other countries, or both), a wireless LAN communication standard such as IEEE802.11, or a mobile communication standard such as LTE, the 4G standard, or the 5G standard. The communication interface 43 communicates with the server apparatus 20. The communication interface 43 may also communicate with the first terminal apparatus 30. The communication interface 43 receives data to be used for the operations of the second terminal apparatus 40, and transmits data obtained by the operations of the second terminal apparatus 40.

The input interface 44 includes at least one interface for input. The interface for input is, for example, a physical key, a capacitive key, a pointing device, a touch screen integrally provided with a display such as a second display 46 as illustrated in FIG. 2 or 5, a visible light camera, a depth camera, a LiDAR sensor, or a microphone. The input interface 44 accepts an operation for inputting data to be used for the operations of the second terminal apparatus 40. The input interface 44, instead of being included in the second terminal apparatus 40, may be connected to the second terminal apparatus 40 as an external input device. As an interface for connection, an interface compliant with a standard such as USB, HDMI® (HDMI is a registered trademark in Japan, other countries, or both), or Bluetooth® (Bluetooth is a registered trademark in Japan, other countries, or both) can be used.

The output interface 45 includes at least one interface for output. The interface for output is, for example, a display such as the second display 46, or a speaker. The display is, for example, an LCD or an organic EL. The second display 46 can be a display of any shape. In the first and second embodiments, the second display 46 is an L-shaped display in side view that has a vertical display plane 47, which extends vertically, and a horizontal display plane 48, which extends horizontally and is adjacent to a lower end of the vertical display plane 47. The output interface 45 outputs data obtained by the operations of the second terminal apparatus 40. The output interface 45, instead of being included in the second terminal apparatus 40, may be connected to the second terminal apparatus 40 as an external output device. As an interface for connection, an interface compliant with a standard such as USB, HDMI® (HDMI is a registered trademark in Japan, other countries, or both), or Bluetooth® (Bluetooth is a registered trademark in Japan, other countries, or both) can be used.

The functions of the second terminal apparatus 40 are realized by execution of another program according to the first or second embodiment by a processor serving as the controller 41. That is, the functions of the second terminal apparatus 40 are realized by software. The program causes a computer to execute the operations of the second terminal apparatus 40, thereby causing the computer to function as the second terminal apparatus 40. That is, the computer executes the operations of the second terminal apparatus in accordance with the program to thereby function as the second terminal apparatus 40.

Some or all of the functions of the second terminal apparatus 40 may be realized by a programmable circuit or a dedicated circuit serving as the controller 41. That is, some or all of the functions of the second terminal apparatus 40 may be realized by hardware.

An outline of the first embodiment will be described with reference to FIGS. 2 and 3, besides FIG. 1.

In FIG. 2, a first space 60 and a second space 70 are adjacent to each other for the sake of illustration, but in reality, the first space 60 and the second space 70 are located far from each other. A first user 61 operates a first image 11 displayed on a first display 36. The first image 11 includes an image of characters handwritten by the first user 61 in the present embodiment, but may include another image, such as an image of a picture drawn by the first user 61, instead of or in addition to the image of the characters. The first user 61 is, for example, a teacher in a remote location who can give a lesson that involves physical movements, such as a calligraphy lesson, by operating the first image 11 with a touch screen. A second user 71 sees the operation on the first image 11 by the first user 61. The second user 71 is, for example, a student who can take the lesson that involves the physical movements, such as the calligraphy lesson, by seeing the operation on the first image 11.

Figure 3:
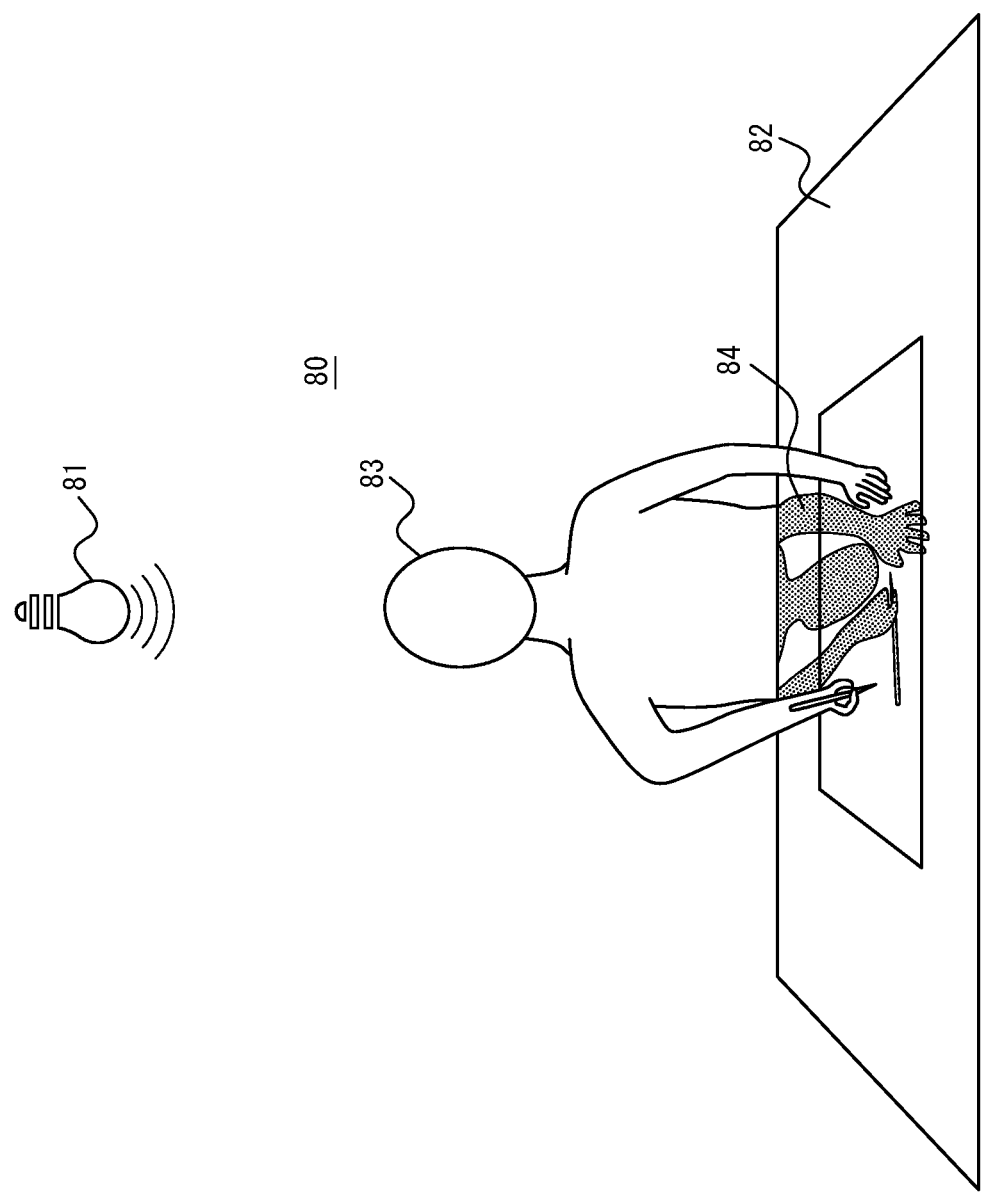
FIG. 3 is a diagram illustrating a virtual three-dimensional space according to the first embodiment of the present disclosure.

The second terminal apparatus 40 disposes, in a virtual three-dimensional space 80 as illustrated in FIG. 3, a virtual light source 81, a display object 82 corresponding to the first display 36, and a user object 83 corresponding to the first user 61. The user object 83 includes an object representing the arm of the first user 61 in the present embodiment, but may include other objects, such as an object representing the head of the first user 61, instead of or in addition to the object representing the arm. The second terminal apparatus 40 generates, as a second image 12, an image of a shadow 84 of the user object 83 casted on the display object 82, based on the positional relationship between the virtual light source 81, the display object 82, and the user object 83. The second image 12 includes an image of a shadow of the object representing the arm of the first user 61 in the present embodiment, but may include an image of a shadow of another object, such as an image of a shadow of the object representing the head of the first user 61, instead of or in addition to the image of the shadow of the object representing the arm. The second terminal apparatus 40 displays the first image 11 on a second display 46 toward the second user 71, and superimposes the second image 12 on the first image 11 on the second display 46.

Upon detecting a change in the relative position of the first user 61 with respect to the first display 36, the second terminal apparatus 40 adjusts the relative position of the user object 83 with respect to the display object 82 according to the detected change. The second terminal apparatus 40 updates the second image 12 based on the positional relationship resulting from the adjustment. The second terminal apparatus 40 reflects the update of the second image 12 on the second display 46.

In the present embodiment, the shadow 84 of the user object 83 corresponding to the first user 61 is displayed on the second display 46, so the second user 71 can see the operation on the first image 11 as if the second user 71 became the first user 61. In other words, according to the present embodiment, it become easier for the second user 71 to recognize the physical movements of the first user 61. For example, it becomes easier for a student to recognize a teacher's physical movements during a lesson that involves physical movements, such as a calligraphy lesson, by displaying, toward the student, a shadow of a body part e.g. the arm of the teacher in a remote location and linking the shadow to the teacher's actual physical movements.

The present embodiment can be applied to remote dialogue systems, such as videoconferencing systems, in which users can interact while viewing video images of the other party with whom the users are conversing. For example, in a case in which a remote dialogue system is used to realize a service in which a student receives a lesson that involves arm movements, such as a calligraphy lesson, from a teacher in a remote location, two remote dialogue terminal apparatuses each of which has a desk-type display are connected online. By displaying, on the student's display, an image that mimics a shadow of the teacher's arm casted on the teacher's display, the student can indirectly see the difference between the student's arm movements and the teacher's arm movements.

The first terminal apparatus 30 corresponds to one of the two remote dialogue terminal apparatuses. The first terminal apparatus 30 displays a first image 11 on a horizontal display plane 38 of a first display 36. The first terminal apparatus 30 generates a visible light image of a first user 61 using a visible light camera. The first terminal apparatus 30 generates a depth image of the first user 61 using a depth camera.

The second terminal apparatus 40 corresponds to the other of the two remote dialogue terminal apparatuses. The second terminal apparatus 40 receives the visible light image and the depth image from the first terminal apparatus 30. The second terminal apparatus 40 disposes a 3D object of the dialogue partner in a virtual three-dimensional space 80 based on the received visible light image and depth image. Based on the position of a virtual light source 81 in the virtual three-dimensional space 80, the second terminal apparatus 40 generates, as a second image 12, an image of a shadow of the 3D object casted on a plane, which corresponds to the horizontal display plane 38 of the first display 36, in the virtual three-dimensional space 80. The second terminal apparatus 40 displays the first image 11, which is displayed on the first display 36, on a horizontal display plane 48 of a second display 46, and also displays the second image 12 on the horizontal display plane 48 of the second display 46 in such a manner as to superimpose the second image 12 on the first image 11. This can give the second user 71 the illusion that the second user 71 has become the dialogue partner. For example, when a student tries to write characters at the same time as a teacher, who is a dialogue partner, the student can indirectly see the difference in arm movements between the two by comparing an actual shadow of the student's arm with a shadow of the teacher's arm that is displayed on a top surface of a desk-type display.

The second terminal apparatus 40 may also display an image on a vertical display plane 47 of the second display 46. For example, the second terminal apparatus 40 may display, on the vertical display plane 47, an image of the user object 83 captured by a virtual camera that is disposed in such a position as to capture the user object 83 from the front in the virtual three-dimensional space 80.

In the present embodiment, a light source 72 capable of illuminating the horizontal display plane 48 of the second display 46 is installed in a second space 70. The second terminal apparatus 40 disposes the virtual light source 81 at a position in the virtual three-dimensional space 80, corresponding to the position of the light source 72 in the second space 70. This makes it easier for the second user 71 to compare physical movements of the second user 71 with physical movements of the first user 61. For example, when there is no difference in arm movements between a student and a teacher, an actual shadow of the student's arm coincides with a shadow of the teacher's arm displayed on a top surface of a desk-type display. This allows the student to easily determine whether the student's arm movements are appropriate.

Operations of the second terminal apparatus 40 according to the present embodiment will be described with reference to FIG. 4. These operations correspond to an image display method according to the present embodiment.

Figure 4:
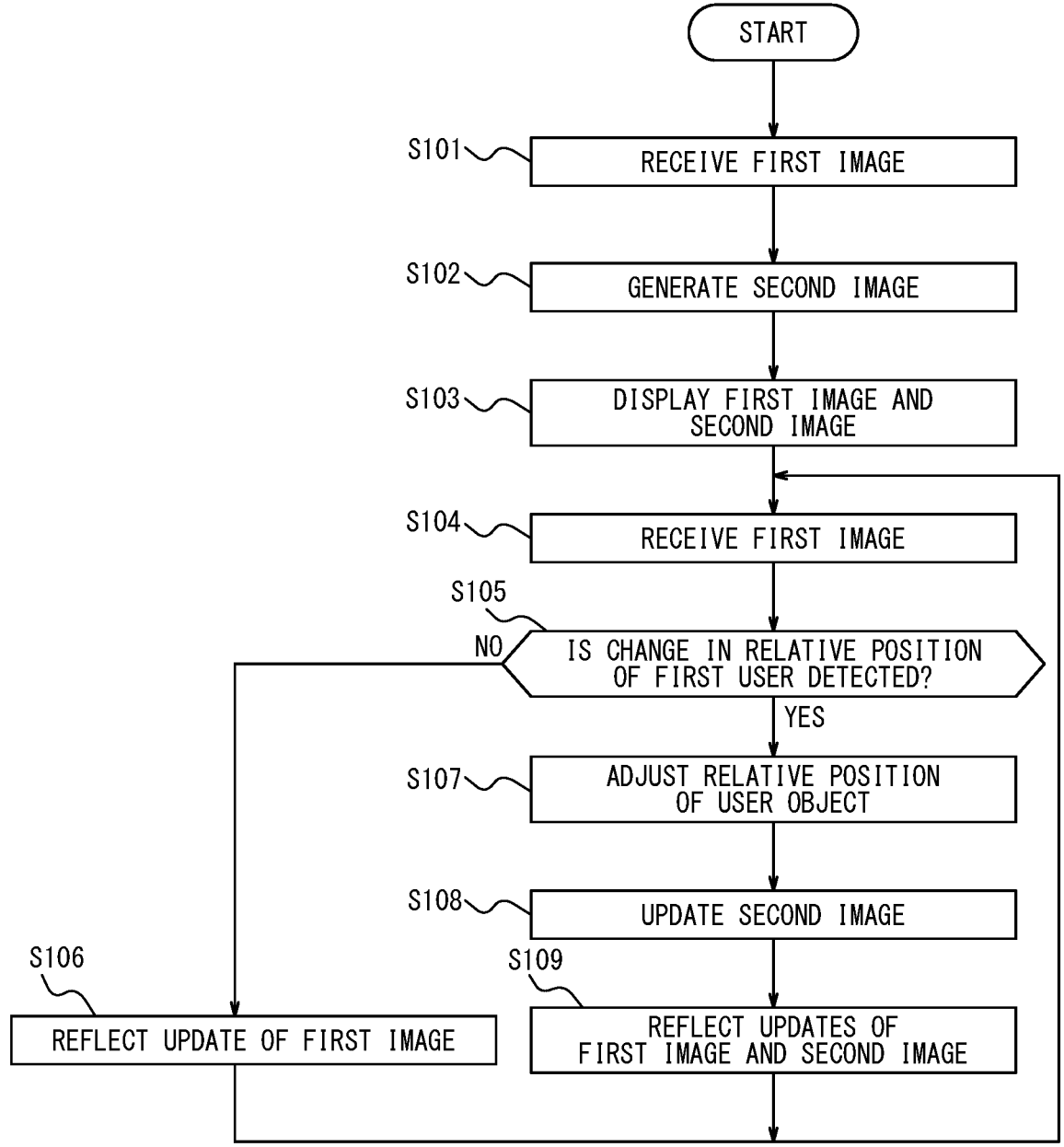
FIG. 4 is a flowchart illustrating operations of a second terminal apparatus according to the first embodiment of the present disclosure.

A flow illustrated in FIG. 4 is repeated while a first user 61 and a second user 71 are conducting video-based communication, such as web conferencing, using the first terminal apparatus 30 and the second terminal apparatus 40, respectively.

In step S101, the controller 41 of the second terminal apparatus 40 receives a first image 11, and a visible light image and a depth image of the first user 61 from the server apparatus 20 via the communication interface 43, and transmits a visible light image and a depth image of the second user 71 to the server apparatus 20 via the communication interface 43. The first image 11 includes an image of characters handwritten by the first user 61. The first image 11 specifically includes an image of paper and an image of black characters that are handwritten by the first user 61 on the image of paper with a touch screen. The controller 41 may further receive a voice of the first user 61 from the server apparatus 20 via the communication interface 43. The controller 41 may further transmit a voice of the second user 71 to the server apparatus 20 via the communication interface 43. The process in step S101 is specifically executed in the following procedure.

The controller 31 of the first terminal apparatus 30 displays a first image 11 on a horizontal display plane 38 of a first display 36 as the output interface 35. The controller 31 captures a visible light image and a depth image of the first user 61 using a visible light camera and a depth camera as the input interface 34, respectively. The controller 31 transmits the displayed first image 11 and the captured visible light image and depth image to the server apparatus 20 via the communication interface 33. The controller 31 may acquire a voice of the first user 61 via a microphone as the input interface 34, and further transmit the acquired voice to the server apparatus 20 via the communication interface 33. The server apparatus 20 receives the first image 11 and the visible light image and depth image of the first user 61 from the first terminal apparatus 30 via the network 50. The server apparatus 20 transmits the received first image 11 and the received visible light image and depth image of the first user 61 to the second terminal apparatus 40 via the network 50. In a case in which the voice of the first user 61 is received from the first terminal apparatus 30, the server apparatus 20 transmits the received voice to the second terminal apparatus 40 via the network 50. The controller 41 of the second terminal apparatus 40 receives the first image 11 and the visible light image and depth image of the first user 61 from the server apparatus 20 via the communication interface 43. The controller 41 may further receive the voice of the first user 61 from the server apparatus 20 via the communication interface 43.

The controller 41 of the second terminal apparatus 40 captures a visible light image and a depth image of the second user 71 using a visible light camera and a depth camera as the input interface 44, respectively. The controller 41 transmits the captured visible light image and depth image to the server apparatus 20 via the communication interface 43. The controller 41 may acquire a voice of the second user 71 via a microphone as the input interface 44, and further transmit the acquired voice to the server apparatus 20 via the communication interface 43. The server apparatus 20 receives the visible light image and depth image of the second user 71 from the second terminal apparatus 40 via the network 50. The server apparatus 20 transmits the received visible light image and depth image to the first terminal apparatus 30 via the network 50. In a case in which the voice of the second user 71 is received from the second terminal apparatus 40, the server apparatus 20 transmits the received voice to the first terminal apparatus 30 via the network 50. The controller 31 of the first terminal apparatus 30 receives the visible light image and depth image of the second user 71 from the server apparatus 20 via the communication interface 33. The controller 31 may further receive the voice of the second user 71 from the server apparatus 20 via the communication interface 33.

In step S102, the controller 41 of the second terminal apparatus 40 disposes a virtual light source 81, a display object 82 corresponding to the first display 36, and a user object 83 corresponding to the first user 61 in a virtual three-dimensional space 80. The user object 83 includes an object representing the arm of the first user 61. Specifically, the user object 83 includes objects representing respective body parts of the upper body of the first user 61, such as the arms and head of the first user 61. The controller 41 generates, as a second image 12, an image of a shadow 84 of the user object 83 casted on the display object 82, based on the positional relationship between the virtual light source 81, the display object 82, and the user object 83. The second image 12 includes an image of a shadow of the object representing the arm of the first user 61. Specifically, the second image 12 includes an image of shadows of the objects representing the respective body parts of the upper body of the first user 61. The process in step S102 is specifically executed in the following procedure.

The controller 41 of the second terminal apparatus 40 identifies the relative position of the first user 61 with respect to the first display 36, with reference to the depth image of the first user 61 received in step S101. The controller 41 may identify the relative position of the first user 61, with reference to information regarding a distance between the first display 36 and the depth camera used to capture the depth image of the first user 61, in addition to the depth image of the first user 61. The information regarding the distance may be stored in advance in the memory 42 of the second terminal apparatus 40, or may be notified appropriately from the first terminal apparatus 30 to the second terminal apparatus 40. In a case in which the depth camera is integrated with or located near the first display 36, the controller 41 may identify the relative position of the first user 61 with reference to only the depth image of the first user 61. The controller 41 sets the relative position of a user object 83 with respect to a display object 82 according to the identified relative position. More specifically, the controller 41 disposes a display object 82 and a user object 83 in a virtual three-dimensional space 80 so that the relative positions of the objects representing the respective body parts of the upper body of the first user 61, which are included in the user object 83, with respect to the display object 82 coincide with the relative positions of the respective body parts of the upper body of the first user 61 with respect to the first display 36.

The controller 41 of the second terminal apparatus 40 sets the relative position of a virtual light source 81 with respect to the display object 82, according to the relative position of a light source 72 disposed in a second space 70 with respect to a second display 46. More specifically, the controller 41 disposes a virtual light source 81 and the display object 82 in the virtual three-dimensional space 80 so that the relative position of the virtual light source 81 with respect to the display object 82 coincides with the relative position of the light source 72 with respect to the second display 46. Alternatively, the controller 41 may dispose the virtual light source 81 and the display object 82 in the virtual three-dimensional space 80 so that the relative position of the virtual light source 81 with respect to the display object 82 coincides with a preset relative position.

The controller 41 of the second terminal apparatus 40 computes, based on the position of the virtual light source 81 in the virtual three-dimensional space 80, shadows of the objects, included in the user object 83, representing the respective body parts of the upper body of the first user 61. The shadows are casted on a surface of the display object 82 corresponding to the horizontal display plane 38 of the first display 36. As a method for computing the shadows, the same method as a known 3D computer graphics method can be used. The controller 41 generates an image of the computed shadows, as a second image 12.

In step S103, the controller 41 of the second terminal apparatus 40 displays, toward the second user 71, the first image 11 received in step S101 on a second display 46 as the output interface 45, and superimposes the second image 12 generated in step S102 on the first image 11 on the second display 46. The process in step S103 is specifically executed in the following procedure.

The controller 41 of the second terminal apparatus 40 displays the first image 11 on a horizontal display plane 48 of a second display 46, and also displays the second image 12 on the horizontal display plane 48 of the second display 46 in such a manner as to superimpose the second image 12 on the first image 11. After rendering the user object 83 with reference to the visible light image of the first user 61 received in step S101, the controller 41 may display, on a vertical display plane 47 of the second display 46, an image of the user object 83 captured by a virtual camera disposed in such a position as to capture the user object 83 from the front in the virtual three-dimensional space 80. In a case in which the voice of the first user 61 is received in step S101, the controller 41 may output the received voice from a speaker as the output interface 45.

When displaying the first image 11 on the second display 46, the controller 41 of the second terminal apparatus 40 may display an image of characters included in the first image 11 as is, but in the present embodiment, the image of the characters is displayed in a color other than black, such as vermilion. More specifically, the controller 41 identifies, based on a temporal change of the first image 11, unchanging portions on the image of paper included in the first image 11, as character portions. The controller 41 converts the color of the identified character portions to a color other than black, such as vermilion. When displaying the first image 11 on the horizontal display plane 48 of the second display 46, the controller 41 displays an image after converting the color of the character portions. According to the present embodiment, displaying the character portions in a color other than black, such as vermilion, makes it possible to avoid misidentification of characters, due to a shadow of the hand casted on the character portions. The identification of the character portions, or the identification of the character portions and the conversion of the color of the character portions may be performed by the controller 31 of the first terminal apparatus 30, instead of the controller 41 of the second terminal apparatus 40.

In step S104, the controller 41 of the second terminal apparatus 40 receives the latest first image 11, and the latest visible light image and depth image of the first user 61 from the server apparatus 20 via the communication interface 43, and transmits the latest visible light image and depth image of the second user 71 to the server apparatus 20 via the communication interface 43. The controller 41 may further receive the latest voice of the first user 61 from the server apparatus 20 via the communication interface 43. The controller 41 may further transmit the latest voice of the second user 71 to the server apparatus 20 via the communication interface 43. A concrete procedure of the process in step S104 is the same as that of the process in step S101, and thus a description thereof is omitted.

The process in step S104 is executed each time the first image 11 is transmitted. In the present embodiment, the first image 11 is transmitted from the first terminal apparatus 30 when the first image 11 has changed automatically or by some operation by the first user 61, such as writing a character. However, the first image 11 may be transmitted from the first terminal apparatus 30 periodically, regardless of whether the first image 11 has changed.

In step S105, the controller 41 of the second terminal apparatus 40 determines, with reference to the latest depth image of the first user 61 received in step S104, whether the relative position of the first user 61 with respect to the first display 36 has changed. The controller 41 may determine whether the relative position of the first user 61 has changed, with reference to the information regarding the distance between the first display 36 and the depth camera used to capture the depth image of the first user 61, in addition to the depth image of the first user 61. In a case in which the depth camera is integrated with or located near the first display 36, the controller 41 may determine whether the relative position of the first user 61 has changed, with reference to only the depth image of the first user 61.

When it is determined in step S105 that the relative position of the first user 61 has not changed, i.e., when a change in the relative position of the first user 61 is not detected, the process in step S106 is executed again. On the other hand, when it is determined in step S105 that the relative position of the first user 61 has changed, i.e., when a change in the relative position of the first user 61 is detected, the process in step S107 is executed.

In step S106, the controller 41 of the second terminal apparatus 40 reflects only the update of the first image 11 on the second display 46 as the output interface 45. Specifically, the controller 41 replaces the first image 11 displayed on the horizontal display plane 48 of the second display 46 with the latest first image 11 received in step S104, and superimposes the second image 12 displayed on the horizontal display plane 48 of the second display 46 on the latest first image 11. When replacing the first image 11 displayed on the horizontal display plane 48 of the second display 46 with the latest one, the controller 41 displays an image of characters in a color other than black, such as vermilion, as in step S103.

After step S106, the processes in step S104 onward are executed again.

In a case in which the first image 11 is transmitted from the first terminal apparatus 30 periodically, regardless of whether the first image 11 has changed, the latest first image 11 received in step S104 may be identical to the previously received first image 11. In such a case, the process in step S106 may be omitted.

In step S107, the controller 41 of the second terminal apparatus 40 adjusts the relative position of the user object 83 with respect to the display object 82 according to the change detected in step S105. Specifically, the controller 41 updates the setting of the relative position of the user object 83 with respect to the display object 82 according to a relative position after the change detected in step S105. More specifically, for a body part of the upper body of the first user 61 whose relative position with respect to the first display 36 has changed, the controller 41 moves an object representing the body part included in the user object 83 in the virtual three-dimensional space 80, so that the relative position of the object representing the body part, included in the user object 83, with respect to the display object 82 coincides with the relative position of the body part after the change with respect to the first display 36.

In step S108, the controller 41 of the second terminal apparatus 40 updates the second image 12, based on a change in the positional relationship between the virtual light source 81, the display object 82, and the user object 83 resulting from the adjustment in step S107. Specifically, as in step S102, the controller 41 computes, based on the position of the virtual light source 81 in the virtual three-dimensional space 80, shadows of the objects, included in the user object 83, representing the respective body parts of the upper body of the first user 61. The shadows are casted on the surface of the display object 82 corresponding to the horizontal display plane 38 of the first display 36. The controller 41 updates the second image 12 with an image of the computed shadows.

In step S109, the controller 41 of the second terminal apparatus 40 reflects, on the second display 46 as the output interface 45, the update of the first image 11 and the update of the second image 12 in step S108. Specifically, the controller 41 replaces the first image 11 displayed on the horizontal display plane 48 of the second display 46 with the latest first image 11 received in step S104, and replaces the second image 12 displayed on the horizontal display plane 48 of the second display 46 with the latest image of the shadows computed in step S108 in such a manner as to superimpose the latest image of the shadows on the latest first image 11. When replacing the first image 11 displayed on the horizontal display plane 48 of the second display 46 with the latest one, the controller 41 displays an image of characters in a color other than black, such as vermilion, as in step S103. After rendering the user object 83 with reference to the latest visible light image of the first user 61 received in step S104, the controller 41 may display, on the vertical display plane 47 of the second display 46, an image of the user object 83 captured by the virtual camera disposed in such a position as to capture the user object 83 from the front in the virtual three-dimensional space 80. In a case in which the latest voice of the first user 61 is received in step S104, the controller 41 may output the received voice from the speaker as the output interface 45.

After step S109, the processes in step S104 onward are executed again.

In a case in which the first image 11 is transmitted from the first terminal apparatus 30 periodically, regardless of whether the first image 11 has changed, the latest first image 11 received in step S104 may be identical to the previously received first image 11. In such a case, the reflection of the update of the first image 11 may be omitted in step S109.

In the present embodiment, the operations described above allow the second user 71 to see the operation on the first image 11 as if the second user 71 became the first user 61. In other words, according to the present embodiment, it become easier for the second user 71 to recognize the physical movements of the first user 61. For example, it becomes easier for a student to recognize a teacher's physical movements during a lesson that involves physical movements, such as a calligraphy lesson, by displaying, toward the student, a shadow of a body part e.g. the arm of the teacher in a remote location and linking the shadow to the teacher's actual physical movements.

An outline of the second embodiment will be described with reference to FIGS. 5 and 6, besides FIG. 1.

In FIG. 5, as in FIG. 3, a first space 60 and a second space 70 are adjacent to each other for the sake of illustration, but in reality, the first space 60 and the second space 70 are located far from each other. A first user 61 operates a first image 11 displayed on a first display 36. The first image 11 includes an image of characters handwritten by the first user 61 in the present embodiment, but may include another image, such as an image of a picture drawn by the first user 61, instead of or in addition to the image of the characters. The first user 61 is, for example, a teacher in a remote location who can give a lesson that involves physical movements, such as a calligraphy lesson, by operating the first image 11 with a touch screen. A second user 71 sees the operation on the first image 11 by the first user 61. The second user 71 is, for example, a student who can take the lesson that involves the physical movements, such as the calligraphy lesson, by seeing the operation on the first image 11.

Figure 6:
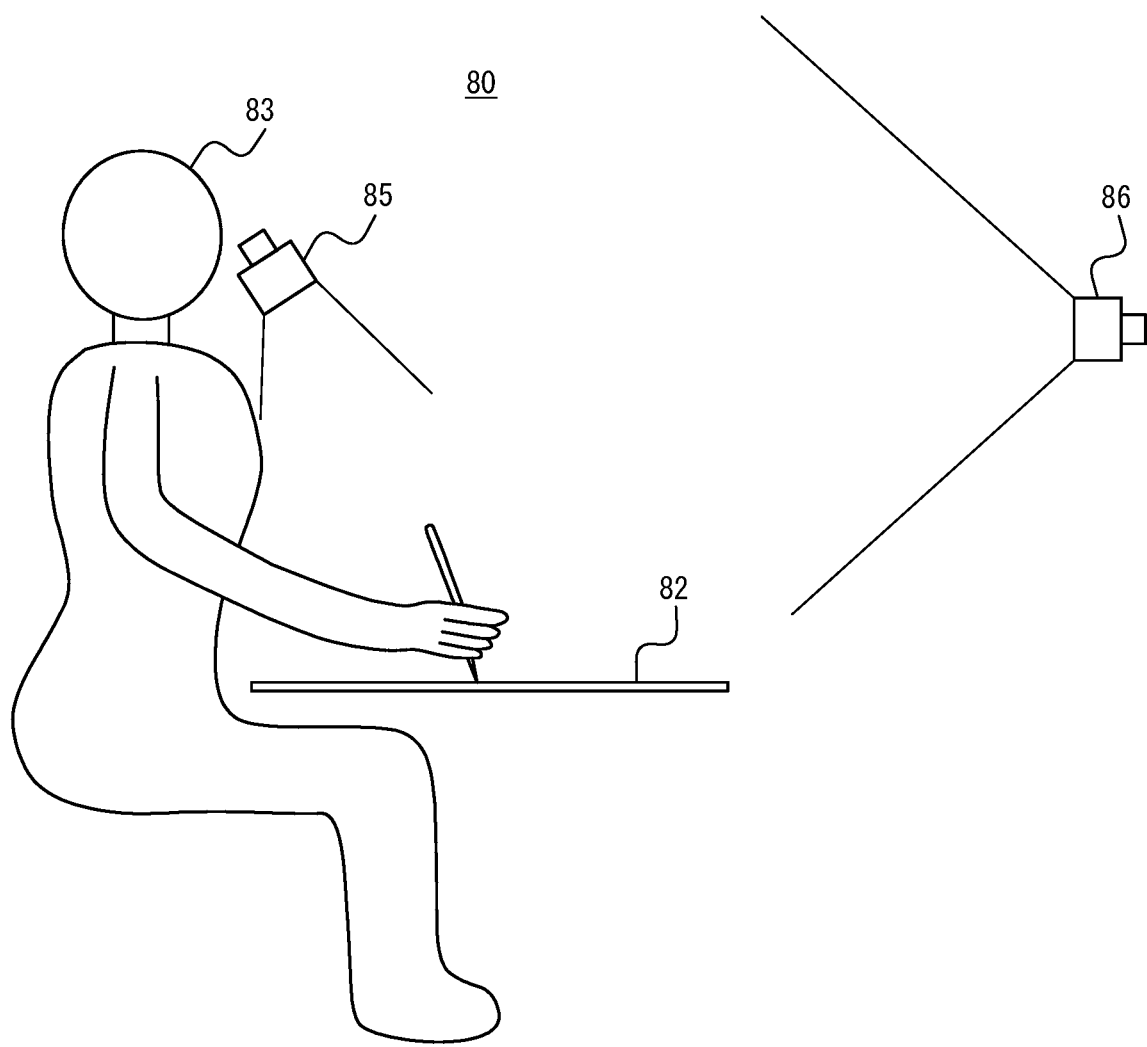
FIG. 6 is a diagram illustrating a virtual three-dimensional space according to the second embodiment of the present disclosure.

The second terminal apparatus 40 disposes, in a virtual three-dimensional space 80 as illustrated in FIG. 6, a first virtual camera 85 and a user object 83 corresponding to the first user 61. The user object 83 includes an object representing the arm of the first user 61 in the present embodiment, but may include another object. The first virtual camera 85 is disposed in such a position as to capture the object representing the arm of the first user 61 from above in the present embodiment, but may be disposed in another location. The second terminal apparatus 40 generates, as a second image 13, an image of the user object 83 captured by the first virtual camera 85, based on the positional relationship between the first virtual camera 85 and the user object 83 and the direction of the first virtual camera 85. The second image 13 includes an image of the object representing the arm of the first user 61 in the present embodiment, but may include an image of the other object. The second terminal apparatus 40 displays the first image 11 on a second display 46 toward the second user 71, and superimposes the second image 13 on the first image 11 on the second display 46.

Upon detecting a change in the line of sight of the second user 71, the second terminal apparatus 40 adjusts the direction of the first virtual camera 85 according to the detected change. The second terminal apparatus 40 updates the second image 13 based on the direction of the first virtual camera 85 after the adjustment. The second terminal apparatus 40 reflects the update of the second image 13 on the second display 46.

In the present embodiment, the image of the user object 83 corresponding to the first user 61 is displayed on the second display 46, so the second user 71 can see the operation on the first image 11 as if the second user 71 became the first user 61. In other words, according to the present embodiment, it become easier for the second user 71 to recognize the physical movements of the first user 61. For example, it becomes easier for a student to recognize a teacher's physical movements during a lesson that involves physical movements, such as a calligraphy lesson, by displaying, toward the student, a 3D image of a body part e.g. the arm of the teacher in a remote location and linking the 3D image to the teacher's actual physical movements.

In the present embodiment, the second terminal apparatus 40 further disposes a display object 82 corresponding to the first display 36 in the virtual three-dimensional space 80. Upon detecting a change in the relative position of the first user 61 with respect to the first display 36, the second terminal apparatus 40 adjusts the relative position of the user object 83 with respect to the display object 82 according to the detected change. The second terminal apparatus 40 updates the second image 12 based on the positional relationship resulting from the adjustment. The second terminal apparatus 40 reflects the update of the second image 12 on the second display 46.

As with the first embodiment, the present embodiment can be applied to remote dialogue systems, such as video-conferencing systems, in which users can interact while viewing video images of the other party with whom the users are conversing. For example, in a case in which a remote dialogue system is used to realize a service in which a student receives a lesson that involves arm movements, such as a calligraphy lesson, from a teacher in a remote location, two remote dialogue terminal apparatuses each of which has a desk-type display are connected online. By rendering a 3D image, such as a hologram of the teacher's arm, on the teacher's display from a pseudo first-person perspective and displaying the 3D image on the student's display, the student can see the teacher's arm movements as if the teacher's arm movements were the student's arm movements.

The first terminal apparatus 30 corresponds to one of the two remote dialogue terminal apparatuses. The first terminal apparatus 30 displays a first image 11 on a horizontal display plane 38 of a first display 36. The first terminal apparatus 30 generates a visible light image of a first user 61 using a visible light camera. The first terminal apparatus 30 generates a depth image of the first user 61 using a depth camera.

The second terminal apparatus 40 corresponds to the other of the two remote dialogue terminal apparatuses. The second terminal apparatus 40 receives the visible light image and the depth image from the first terminal apparatus 30. The second terminal apparatus 40 disposes a 3D object of the dialogue partner in a virtual three-dimensional space 80 based on the received visible light image and depth image. The second terminal apparatus 40 generates a visible light image of a second user 71 using a visible light camera. The second terminal apparatus 40 generates a depth image of the second user 71 using a depth camera. The second terminal apparatus 40 detects the line of sight of the second user 71 based on the visible light image, the depth image, or both. The second terminal apparatus 40 links the direction of a first virtual camera 85 in the virtual three-dimensional space 80 to the line of sight of the second user 71. The second terminal apparatus 40 generates, as a second image 13, a rendered image of a 3D object using the first virtual camera 85. The second terminal apparatus 40 displays the first image 11, which is displayed on the first display 36, on a horizontal display plane 48 of a second display 46, and also displays the second image 13 on the horizontal display plane 48 of the second display 46 in such a manner as to superimpose the second image 13 on the first image 11. This can give the second user 71 the illusion that the second user 71 has become the dialogue partner. For example, a rendered image of a 3D model of a teacher, who is a dialogue partner, from a first-person perspective is displayed on a surface of a desk-type display, a student can see the teacher's arm movements while the teacher is actually writing characters as if the student became the teacher.

In the present embodiment, the second terminal apparatus 40 also displays an image on a vertical display plane 47 of the second display 46. Specifically, the second terminal apparatus 40 may display, on the vertical display plane 47, an image of the user object 83 captured by a second virtual camera 86 that is disposed in such a position as to capture the user object 83 from the front in the virtual three-dimensional space 80. Therefore, the second user 71 can check the movements of the first user 61 on the horizontal display plane 48, while checking the first user 61 on the vertical display plane 47.

Operations of the second terminal apparatus 40 according to the present embodiment will be described with reference to FIG. 7. These operations correspond to an image display method according to the present embodiment.

A flow illustrated in FIG. 7 is repeated while a first user 61 and a second user 71 are conducting video-based communication, such as web conferencing, using the first terminal apparatus 30 and the second terminal apparatus 40, respectively.

The process in step S201 is the same as the process in step S101 in the first embodiment, and thus a description thereof is omitted.

In step S202, the controller 41 of the second terminal apparatus 40 disposes a first virtual camera 85, a second virtual camera 86, a display object 82 corresponding to a first display 36, and a user object 83 corresponding to the first user 61 in a virtual three-dimensional space 80. The user object 83 includes an object representing the arm of the first user 61. Specifically, the user object 83 includes objects representing respective body parts of the upper body of the first user 61, such as the arms and head of the first user 61. The first virtual camera 85 is disposed in such a position as to capture the object representing the arm of the first user 61 from above. Specifically, the first virtual camera 85 is disposed in such a position as to capture the object representing the arm of the first user 61 from a pseudo first-person perspective. The second virtual camera 86 is disposed in such a position as to capture the user object 83 from the front in the virtual three-dimensional space 80. The controller 41 generates, as a second image 13, an image of the user object 83 captured by the first virtual camera 85, based on the positional relationship between the first virtual camera 85 and the user object 83 and the direction of the first virtual camera 85. The second image 13 includes an image of the object representing the arm of the first user 61 from above. The second image 13 specifically includes an image of the arm of the first user 61 as if seen from a first-person perspective. The controller 41 further generates, as a third image 14, an image of the user object 83 captured by the second virtual camera 86, based on the positional relationship between the second virtual camera 86 and the user object 83 and the direction of the second virtual camera 86. The third image 14 includes an image of the objects representing the respective body parts of the upper body of the first user 61 from the front. The third image 14 specifically includes an image of the entire upper body of the first user 61 as if seen from the front. The process in step S202 is specifically executed in the following procedure.

The controller 41 of the second terminal apparatus 40 identifies the relative position of the first user 61 with respect to the first display 36, with reference to a depth image of the first user 61 received in step S201. The controller 41 may identify the relative position of the first user 61, with reference to information regarding a distance between the first display 36 and a depth camera used to capture the depth image of the first user 61, in addition to the depth image of the first user 61. The information regarding the distance may be stored in advance in the memory 42 of the second terminal apparatus 40, or may be notified appropriately from the first terminal apparatus 30 to the second terminal apparatus 40. In a case in which the depth camera is integrated with or located near the first display 36, the controller 41 may identify the relative position of the first user 61 with reference to only the depth image of the first user 61. The controller 41 sets the relative position of the user object 83 with respect to the display object 82 according to the identified relative position. More specifically, the controller 41 disposes the display object 82 and the user object 83 in the virtual three-dimensional space 80 so that the relative positions of the objects representing the respective body parts of the upper body of the first user 61, which are included in the user object 83, with respect to the display object 82 coincide with the relative positions of the respective body parts of the upper body of the first user 61 with respect to the first display 36.

The controller 41 of the second terminal apparatus 40 disposes the first virtual camera 85 in the vicinity of an object, included in the user object 83, representing the head, face, or eyes of the first user 61. The controller 41 sets the direction of the first virtual camera 85 so that the object representing the arm of the first user 61, which is included in the user object 83, and the display object 82 are within a shooting range of the first virtual camera 85.

The controller 41 of the second terminal apparatus 40 disposes the second virtual camera 86 in front of the user object 83. The controller 41 sets the direction of the second virtual camera 86 so that the objects representing the respective body parts of the upper body of the first user 61, which are included in the user object 83, are within a shooting range of the second virtual camera 86.

The controller 41 of the second terminal apparatus 40 generates, as a second image 13, a 3D image of the object representing the arm of the first user 61, which is included in the user object 83, captured by the first virtual camera 85 in the virtual three-dimensional space 80. As a method for generating the 3D image, the same method as a known 3D computer graphics method can be used. When generating the second image 13, the controller 41 may render the object representing the arm of the first user 61 with reference to a visible light image of the first user 61 received in step S201.

The controller 41 of the second terminal apparatus 40 generates, as a third image 14, a 3D image of the objects representing the respective body parts of the upper body of the first user 61, which are included in the user object 83, captured by the second virtual camera 86 in the virtual three-dimensional space 80. As a method for generating the 3D image, the same method as a known 3D computer graphics method can be used. When generating the third image 14, the controller 41 may render the objects representing the respective body parts of the upper body of the first user 61 with reference to the visible light image of the first user 61 received in step S201.

In step S203, the controller 41 of the second terminal apparatus 40 displays, toward the second user 71, the first image 11 received in step S201 on a second display 46 as the output interface 45, and superimposes the second image 13 generated in step S202 on the first image 11 on the second display 46. The controller 41 also displays, toward the second user 71, the third image 14 generated in step S202 on the second display 46. The process in step S203 is specifically executed in the following procedure.

The controller 41 of the second terminal apparatus 40 displays the first image 11 on a horizontal display plane 48 of the second display 46, and also displays the second image 13 on the horizontal display plane 48 of the second display 46 in such a manner as to superimpose the second image 13 on the first image 11. The controller 41 displays the third image 14 on a vertical display plane 47 of the second display 46. In a case in which a voice of the first user 61 is received in step S201, the controller 41 may output the received voice from a speaker as the output interface 45.

When displaying the first image 11 on the second display 46, the controller 41 of the second terminal apparatus 40 may display an image of characters included in the first image 11 as is, but in the present embodiment, as in the first embodiment, the image of the characters is displayed in a color other than black, such as vermilion. More specifically, the controller 41 identifies, based on a temporal change of the first image 11, unchanging portions on an image of paper included in the first image 11, as character portions. The controller 41 converts the color of the identified character portions to a color other than black, such as vermilion. When displaying the first image 11 on the horizontal display plane 48 of the second display 46, the controller 41 displays an image after converting the color of the character portions. According to the present embodiment, displaying the character portions in a color other than black, such as vermilion, makes it possible to avoid misidentification of characters, due to a shadow of the hand casted on the character portions. The identification of the character portions, or the identification of the character portions and the conversion of the color of the character portions may be performed by the controller 31 of the first terminal apparatus 30, instead of the controller 41 of the second terminal apparatus 40.

The processes in steps S204 and S205 are the same as the processes in steps S104 and S105 in the first embodiment, respectively, and thus descriptions thereof are omitted.

When it is determined in step S205 that the relative position of the first user 61 has not changed, i.e., when a change in the relative position of the first user 61 is not detected, the process in step S206 is executed again. On the other hand, when it is determined in step S205 that the relative position of the first user 61 has changed, i.e., when a change in the relative position of the first user 61 is detected, the process in step S208 is executed.

In step S206, the controller 41 of the second terminal apparatus 40 captures a visible light image and a depth image of the second user 71 using a visible light camera and a depth camera as the input interface 44, respectively. The controller 41 determines whether the line of sight of the second user 71 has changed with reference to the captured visible light image, depth image, or both. As a method for detecting the line of sight by image recognition, a known method can be used. Machine learning, such as deep learning, may be used.

When it is determined in step S206 that the line of sight of the second user 71 has not changed, i.e., when a change in the line of sight of the second user 71 is not detected, the process in step S207 is executed. On the other hand, when it is determined in step S206 that the line of sight of the second user 71 has changed, i.e., when a change in the line of sight of the second user 71 is detected, the process in step S210 is executed.

In step S207, the controller 41 of the second terminal apparatus 40 reflects only the update of the first image 11 on the second display 46 as the output interface 45. Specifically, the controller 41 replaces the first image 11 displayed on the horizontal display plane 48 of the second display 46 with the latest first image 11 received in step S204, and superimposes the second image 13 displayed on the horizontal display plane 48 of the second display 46 on the latest first image 11. When replacing the first image 11 displayed on the horizontal display plane 48 of the second display 46 with the latest one, the controller 41 displays an image of characters in a color other than black, such as vermilion, as in step S203.

After step S207, the processes in step S204 onward are executed again.

In a case in which the first image 11 is transmitted from the first terminal apparatus 30 periodically, regardless of whether the first image 11 has changed, the latest first image 11 received in step S204 may be identical to the previously received first image 11. In such a case, the process in step S207 may be omitted.

The process in step S208 is the same as the process in step S107 in the first embodiment, and thus a description thereof is omitted.

After step S208, the process in step S209 is executed. The process in step S209 is the same as the process in step S206, and thus a description thereof is omitted.

When it is determined in step S209 that the line of sight of the second user 71 has not changed, i.e., when a change in the line of sight of the second user 71 is not detected, the process in step S211 is executed. On the other hand, when it is determined in step S209 that the line of sight of the second user 71 has changed, i.e., when a change in the line of sight of the second user 71 is detected, the process in step S210 is executed.

In step S210, the controller 41 of the second terminal apparatus 40 adjusts the direction of the first virtual camera 85 according to the change detected in step S206 or step S209. Specifically, the controller 41 changes the direction of the first virtual camera 85 by the same amount in the same direction as the change detected in step S206 or step S209.

In step S211, in a case in which the process in step S208 has been executed, the controller 41 of the second terminal apparatus 40 updates the second image 13 based on a change in the positional relationship between the first virtual camera 85 and the user object 83 resulting from the adjustment in step S208. In a case in which the process in step S210 has been executed, the controller 41 updates the second image 13 based on the direction of the first virtual camera 85 after the adjustment in step S210. In a case in which both steps S208 and S210 have been executed, the controller 41 updates the second image 13 based on a change in the positional relationship between the first virtual camera 85 and the user object 83 and the direction of the first virtual camera 85 after the adjustment. Specifically, as in step S202, the controller 41 updates the second image 13 with a 3D image of the object representing the arm of the first user 61, which is included in the user object 83, captured by the first virtual camera 85 in the virtual three-dimensional space 80. When updating the second image 13, the controller 41 may render the object representing the arm of the first user 61 with reference to the latest visible light image of the first user 61 received in step S204.

In a case in which the process in step S208 has been executed, the controller 41 of the second terminal apparatus 40 also updates the third image 14, based on a change in the positional relationship between the second virtual camera 86 and the user object 83 resulting from the adjustment in step S208. Specifically, as in step S202, the controller 41 updates the third image 14 with a 3D image of the objects representing the respective body parts of the upper body of the first user 61, which are included in the user object 83, captured by the second virtual camera 86 in the virtual three-dimensional space 80. When updating the third image 14, the controller 41 may render the objects representing the respective body parts of the upper body of the first user 61 with reference to the latest visible light image of the first user 61 received in step S204.

In step S212, the controller 41 of the second terminal apparatus 40 reflects, on the second display 46 as the output interface 45, the update of the first image 11 and the update of the second image 13 in step S211. Specifically, the controller 41 replaces the first image 11 displayed on the horizontal display plane 48 of the second display 46 with the latest first image 11 received in step S204, and replaces the second image 13 displayed on the horizontal display plane 48 of the second display 46 with a 3D image captured by the first virtual camera 85 obtained in step S211 in such a manner as to superimpose the 3D image on the latest first image 11. When replacing the first image 11 displayed on the horizontal display plane 48 of the second display 46 with the latest one, the controller 41 displays an image of characters in a color other than black, such as vermilion, as in step S203. In a case in which the latest voice of the first user 61 is received in step S204, the controller 41 may output the received voice from the speaker as the output interface 45.

In a case in which the third image 14 is also updated in step S211, the controller 41 of the second terminal apparatus 40 also reflects, on the second display 46, the update of the third image 14 in step S211. Specifically, controller 41 replaces the third image 14 displayed on the vertical display plane 47 of the second display 46 with a 3D image captured by the second virtual camera 86 in step S211.

After step S212, the processes in step S204 onward are executed again.

In a case in which the first image 11 is transmitted from the first terminal apparatus 30 periodically, regardless of whether the first image 11 has changed, the latest first image 11 received in step S204 may be identical to the previously received first image 11. In such a case, the reflection of the update of the first image 11 may be omitted in step S212.

In the present embodiment, the operations described above allow the second user 71 to see the operation on the first image 11 as if the second user 71 became the first user 61. In other words, according to the present embodiment, it become easier for the second user 71 to recognize the physical movements of the first user 61. For example, it becomes easier for a student to recognize a teacher's physical movements during a lesson that involves physical movements, such as a calligraphy lesson, by displaying, toward the student, a 3D image of a body part e.g. the arm of the teacher in a remote location and linking the 3D image to the teacher's actual physical movements.

Examples of some embodiments of the present disclosure are described below. However, it should be noted that the embodiments of the present disclosure are not limited to these examples.

[Appendix 1] A terminal apparatus comprising a controller configured to:
  generate, based on a positional relationship between a virtual light source, a display object corresponding to a first display, and a user object corresponding to a first user who operates a first image displayed on the first display, an image of a shadow of the user object casted on the display object, as a second image, the virtual light source, the display object, and the user object being disposed in a virtual three-dimensional space;
  display the first image on a second display toward a second user who is present in a second space separate from a first space in which the first user is present, and superimpose the second image on the first image on the second display;
  upon detecting a change in a relative position of the first user with respect to the first display, adjust a relative position of the user object with respect to the display object according to the detected change;
  update the second image based on a change in the positional relationship resulting from adjustment; and
  reflect an update of the second image on the second display.

[Appendix 2] The terminal apparatus according to appendix 1, further comprising a communication interface configured to communicate with another terminal apparatus used by the first user,
  wherein the controller is configured to:
    receive a depth image of the first user via the communication interface; and
    identify, with reference to the received depth image, the relative position of the first user with respect to the first display.

[Appendix 3] The terminal apparatus according to appendix 1 or 2, wherein the controller is configured to set a relative position of the virtual light source with respect to the display object, according to a relative position of a light source disposed in the second space with respect to the second display.

[Appendix 4] The terminal apparatus according to any one of appendices 1 to 3, wherein the user object includes an object representing an arm of the first user.

[Appendix 5] The terminal apparatus according to any one of appendices 1 to 4, further comprising an L-shaped display in side view corresponding to the second display, the L-shaped display having a vertical display plane extending vertically and a horizontal display plane extending horizontally, the horizontal display plane being adjacent to a lower end of the vertical display plane,
  wherein the controller is configured to display the first image and the second image on the horizontal display plane.

[Appendix 6] The terminal apparatus according to any one of appendices 1 to 5, wherein the first image includes an image of a character handwritten by the first user.

[Appendix 7] The terminal apparatus according to appendix 6, wherein the controller is configured to display the image of the character in a color other than black when displaying the first image on the second display.

[Appendix 8] The terminal apparatus according to appendix 7, wherein the controller is configured to display the image of the character in vermilion.

[Appendix 9] A terminal apparatus comprising a controller configured to:
  generate, based on a positional relationship between a virtual camera, and a user object corresponding to a first user who operates a first image displayed on a first display, and a direction of the virtual camera, an image of the user object captured by the virtual camera, as a second image, the virtual camera and the user object being disposed in a virtual three-dimensional space;
  display the first image on a second display toward a second user who is present in a second space separate from a first space in which the first user is present, and superimpose the second image on the first image on the second display;
  upon detecting a change in a line of sight of the second user, adjust the direction of the virtual camera according to the detected change;
  update the second image based on a direction of the virtual camera after adjustment; and
  reflect an update of the second image on the second display.

[Appendix 10] The terminal apparatus according to appendix 9, wherein the controller is configured to:
  adjust a relative position of the user object with respect to a display object corresponding to the first display according to a change in a relative position of the first user with respect to the first display, the display object being disposed in the virtual three-dimensional space;
  update the second image based on a change in the positional relationship resulting from adjustment; and
  reflect updates of the second image on the second display.

[Appendix 11] The terminal apparatus according to appendix 10, further comprising a communication interface configured to communicate with another terminal apparatus used by the first user,
  wherein the controller is configured to:
    receive a depth image of the first user via the communication interface; and
    identify, with reference to the received depth image, the relative position of the first user with respect to the first display.

[Appendix 12] The terminal apparatus according to any one of appendices 9 to 11, wherein
  the user object includes an object representing an arm of the first user, and
  the virtual camera is disposed in such a position as to capture the object representing the arm of the first user from above.

[Appendix 13] The terminal apparatus according to any one of appendices 9 to 11, further comprising an L-shaped display in side view corresponding to the second display, the L-shaped display having a vertical display plane extending vertically and a horizontal display plane extending horizontally, the horizontal display plane being adjacent to a lower end of the vertical display plane,
  wherein the controller is configured to display the first image and the second image on the horizontal display plane.

[Appendix 14] The terminal apparatus according to appendix 13, wherein the controller is configured to:
  generate, where the virtual camera is a first virtual camera, and another virtual camera disposed in such a position as to capture the user object from front in the virtual three-dimensional space is a second virtual camera, an image of the user object captured by the second virtual camera, as a third image, based on a positional relationship between the second virtual camera and the user object, and a direction of the second virtual camera; and display the third image on the vertical display plane.

[Appendix 15] The terminal apparatus according to any one of appendices 9 to 14, wherein the first image includes an image of a character handwritten by the first user.

[Appendix 16] The terminal apparatus according to appendix 15, wherein the controller is configured to display the image of the character in a color other than black when displaying the first image on the second display.

[Appendix 17] The terminal apparatus according to appendix 16, wherein the controller is configured to display the image of the character in vermilion.

[Appendix 18] An image display method comprising:

generating, based on a positional relationship between a virtual light source, a display object corresponding to a first display, and a user object corresponding to a first user who operates a first image displayed on the first display, or based on a positional relationship between a virtual camera, and the user object, and a direction of the virtual camera, an image of a shadow of the user object casted on the display object or an image of the user object captured by the virtual camera, as a second image, the virtual light source, the display object, and the user object being disposed in a virtual three-dimensional space, or the virtual camera and the user object being disposed in the virtual three-dimensional space;

displaying the first image on a second display toward a second user who is present in a second space separate from a first space in which the first user is present;

superimposing the second image on the first image on the second display;

upon detecting a change in a relative position of the first user with respect to the first display or a change in a line of sight of the second user, adjusting a relative position of the user object with respect to the display object or the direction of the virtual camera according to the detected change;

updating the second image based on a change in the positional relationship resulting from adjustment or based on a direction of the virtual camera after adjustment; and reflecting an update of the second image on the second display.

[Appendix 19] A program configured to cause a computer to execute operations corresponding to the image display method according to appendix 18.

The present disclosure is not limited to the embodiments described above. For example, two or more blocks described in the block diagram may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. A terminal apparatus comprising a controller configured to:

generate, based on a positional relationship between a virtual light source, a display object corresponding to a first display, and a user object corresponding to a first user who operates a first image displayed on the first display, an image of a shadow of the user object casted on the display object, as a second image, the virtual light source, the display object, and the user object being disposed in a virtual three-dimensional space;

display the first image on a second display toward a second user who is present in a second space separate from a first space in which the first user is present, and superimpose the second image on the first image on the second display;

upon detecting a change in a relative position of the first user with respect to the first display, adjust a relative position of the user object with respect to the display object according to the detected change;

update the second image based on a change in the positional relationship resulting from adjustment; and reflect an update of the second image on the second display.

2. The terminal apparatus according to claim 1, further comprising a communication interface configured to communicate with another terminal apparatus used by the first user, wherein the controller is configured to:
receive a depth image of the first user via the communication interface; and
identify, with reference to the received depth image, the relative position of the first user with respect to the first display.

3. The terminal apparatus according to claim 1, wherein the controller is configured to set a relative position of the virtual light source with respect to the display object, according to a relative position of a light source disposed in the second space with respect to the second display.

4. The terminal apparatus according to claim 1, wherein the user object includes an object representing an arm of the first user.

5. The terminal apparatus according to claim 1, further comprising an L-shaped display in side view corresponding to the second display, the L-shaped display having a vertical display plane extending vertically and a horizontal display plane extending horizontally, the horizontal display plane being adjacent to a lower end of the vertical display plane, wherein the controller is configured to display the first image and the second image on the horizontal display plane.

6. The terminal apparatus according to claim 1, wherein the first image includes an image of a character handwritten by the first user.

7. The terminal apparatus according to claim 6, wherein the controller is configured to display the image of the character in a color other than black when displaying the first image on the second display.

8. The terminal apparatus according to claim 7, wherein the controller is configured to display the image of the character in vermilion.

9. A terminal apparatus comprising a controller configured to:

generate, based on a positional relationship between a virtual camera, and a user object corresponding to a first user who operates a first image displayed on a first display, and a direction of the virtual camera, an image of the user object captured by the virtual camera, as a second image, the virtual camera and the user object being disposed in a virtual three-dimensional space;

display the first image on a second display toward a second user who is present in a second space separate from a first space in which the first user is present, and superimpose the second image on the first image on the second display;

upon detecting a change in a line of sight of the second user, adjust the direction of the virtual camera according to the detected change;

update the second image based on a direction of the virtual camera after adjustment; and reflect an update of the second image on the second display.

10. The terminal apparatus according to claim 9, wherein the controller is configured to:

adjust a relative position of the user object with respect to a display object corresponding to the first display according to a change in a relative position of the first user with respect to the first display, the display object being disposed in the virtual three-dimensional space;

update the second image based on a change in the positional relationship resulting from adjustment; and reflect updates of the second image on the second display.

11. The terminal apparatus according to claim 10, further comprising a communication interface configured to communicate with another terminal apparatus used by the first user, wherein the controller is configured to:

receive a depth image of the first user via the communication interface; and identify, with reference to the received depth image, the relative position of the first user with respect to the first display.

12. The terminal apparatus according to claim 9, wherein the user object includes an object representing an arm of the first user, and the virtual camera is disposed in such a position as to capture the object representing the arm of the first user from above.

13. The terminal apparatus according to claim 9, further comprising an L-shaped display in side view corresponding to the second display, the L-shaped display having a vertical display plane extending vertically and a horizontal display plane extending horizontally, the horizontal display plane being adjacent to a lower end of the vertical display plane, wherein the controller is configured to display the first image and the second image on the horizontal display plane.

14. The terminal apparatus according to claim 13, wherein the controller is configured to:

generate, where the virtual camera is a first virtual camera, and another virtual camera disposed in such a position as to capture the user object from front in the virtual three-dimensional space is a second virtual camera, an image of the user object captured by the second virtual camera, as a third image, based on a positional relationship between the second virtual camera and the user object, and a direction of the second virtual camera; and display the third image on the vertical display plane.

15. The terminal apparatus according to claim 9, wherein the first image includes an image of a character handwritten by the first user.

16. The terminal apparatus according to claim 15, wherein the controller is configured to display the image of the character in a color other than black when displaying the first image on the second display.

17. The terminal apparatus according to claim 16, wherein the controller is configured to display the image of the character in vermilion.

18. An image display method comprising:

generating, based on a positional relationship between a virtual light source, a display object corresponding to a first display, and a user object corresponding to a first user who operates a first image displayed on the first display, or based on a positional relationship between a virtual camera, and the user object, and a direction of the virtual camera, an image of a shadow of the user object casted on the display object or an image of the user object captured by the virtual camera, as a second image, the virtual light source, the display object, and the user object being disposed in a virtual three-dimensional space, or the virtual camera and the user object being disposed in the virtual three-dimensional space;

displaying the first image on a second display toward a second user who is present in a second space separate from a first space in which the first user is present;

superimposing the second image on the first image on the second display;

upon detecting a change in a relative position of the first user with respect to the first display or a change in a line of sight of the second user, adjusting a relative position of the user object with respect to the display object or the direction of the virtual camera according to the detected change;

updating the second image based on a change in the positional relationship resulting from adjustment or based on a direction of the virtual camera after adjustment; and reflecting an update of the second image on the second display.

19. A non-transitory computer readable medium storing a program configured to cause a computer to execute operations corresponding to the image display method according to claim 18.

* * * * *